United States Patent
Li et al.

(10) Patent No.: US 9,312,541 B2
(45) Date of Patent: Apr. 12, 2016

(54) COBALT OXIDE, COMPOSITE OF COBALT OXIDE, AND METHOD FOR MAKING THE SAME

(71) Applicants: Tsinghua University, Beijing (CN); HON HAI PRECISION INDUSTRY CO., LTD., New Taipei (TW)

(72) Inventors: Jian-Jun Li, Beijing (CN); Xiang-Ming He, Beijing (CN); Li Wang, Beijing (CN); Dan Wang, Beijing (CN); Xian-Kun Huang, Beijing (CN); Chang-Yin Jiang, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/304,052

(22) Filed: Jun. 13, 2014

(65) Prior Publication Data
US 2014/0295283 A1 Oct. 2, 2014

Related U.S. Application Data

(63) Continuation of application No. 13/281,779, filed on Oct. 26, 2011, now Pat. No. 8,801,974.

(30) Foreign Application Priority Data

Jun. 22, 2011 (CN) .......................... 2011 1 0168996

(51) Int. Cl.
*H01M 4/525* (2010.01)
*H01M 4/13* (2010.01)
*H01M 4/36* (2006.01)
*H01M 4/58* (2010.01)
*C01G 51/00* (2006.01)
*H01B 1/08* (2006.01)
*H01B 1/02* (2006.01)

(52) U.S. Cl.
CPC ............... *H01M 4/525* (2013.01); *C01G 51/42* (2013.01); *H01M 4/13* (2013.01); *H01M 4/366* (2013.01); *H01M 4/5825* (2013.01); *C01P 2002/72* (2013.01); *C01P 2002/77* (2013.01); *C01P 2004/03* (2013.01); *C01P 2004/80* (2013.01); *C01P 2006/40* (2013.01); *H01B 1/02* (2013.01); *H01B 1/08* (2013.01); *Y02E 60/122* (2013.01)

(58) Field of Classification Search
None
See application file for complete search history.

(56) References Cited

U.S. PATENT DOCUMENTS

| 6,211,995 B1 * | 4/2001 | Azens et al. .................. 359/273 |
| 2005/0118511 A1 * | 6/2005 | Park et al. ..................... 429/324 |
| 2010/0028768 A1 * | 2/2010 | Morita et al. ................. 429/144 |

OTHER PUBLICATIONS

Kim et al. Surface and bulk structure investigation of fully delithiated bare and AlPO4 coated LixCoO2 (x=0) cathode materials annealed between 200 and 400C. Journal of Power Sources 174 (2007) 895-899.*
Venkatraman et al. Comparison of the phase relationships of chemically delithiated layered Li1-xCo1-yMyO2 (M=Al and Mg) oxides. Solid State Ionics. 176 (2005) 291-298.*
Yang et al. Synthesis and characterization of layered Li1-x(Ni0.5Co0.5)1-yFeyO2 cathodes. Solid State Ionics 177 (2006) 863-868.*
Y.J.Shi et al., Improved electrochemical performance of AlPO4-coated LiMn1.5Ni0.5O4 electrode for lithium-ion batteries, Journal of Power Sources, Apr. 8, 2010, vol. 195, pp. 6860-6866.
Liu Ya-fei et al., Study on the electrochemical performance and overcharge characteristics of LiCoO2, Battery Bimonthly, Aug. 31, 2007, vol. 37, pp. 250-253.
Joon-Gon Lee et al, Effect of AlPO4-Nanoparticle Coating Concentration on High-cutoff-Voltage Electrochemical Performances in LiCoO2,Journal of the electrochemical society, Apr. 26, 2004,vol. 151, Issue 6, pp. A801-A805.

* cited by examiner

*Primary Examiner* — Tanisha Diggs
(74) *Attorney, Agent, or Firm* — Novak Druce Connolly Bove + Quigg LLP

(57) ABSTRACT

A cobalt oxide is disclosed and is represented by a chemical formula of $Co_{1-y}M_yO_2$, wherein $0 \le y \le 0.9$, and M is selected from the group consisting of alkali metal elements, alkaline-earth metal elements, Group-13 elements, Group-14 elements, transition metal elements, and rare-earth elements. A composite of cobalt oxide includes a cobalt oxide and an aluminum phosphate layer coated on a surface of the cobalt oxide.

8 Claims, 11 Drawing Sheets ered to be within the scope of the present embodiments as defined in the claims.
COBALT OXIDE, COMPOSITE OF COBALT OXIDE, AND METHOD FOR MAKING THE SAME

CROSS-REFERENCE TO RELATED APPLICATIONS

This application claims all benefits accruing under 35 U.S.C. §119 from China Patent Application No. 201110168996.3, filed on Jun. 22, 2011, in the China Intellectual Property Office, the contents of which are hereby incorporated by reference. This application is a continuation of U.S. patent application Ser. No. 13/281,779, filed on Oct. 26, 2011, entitled, "COBALT OXIDE, COMPOSITE OF COBALT OXIDE, AND METHOD FOR MAKING THE SAME".

BACKGROUND

1. Technical Field

The present disclosure relates to cobalt oxides, composites of cobalt oxides, and methods for making the same.

2. Description of Related Art

There are three stable oxide forms of cobalt, cobalt (II) oxide (CoO), cobalt (III) oxide ($Co_2O_3$), and cobalt (II,III) oxide ($Co_3O_4$). Although cobalt can have a valence of +4, a practical method for making a stable oxide of cobalt having +4 valence has not been achieved.

What is needed, therefore, is to provide a cobalt oxide, a composite of cobalt oxide, and a method for making the same to form a stable cobalt oxide having +4 valence of cobalt.

BRIEF DESCRIPTION OF THE DRAWING

Many aspects of the present disclosure can be better understood with reference to the following drawings. The components in the drawings are not necessarily to scale, the emphasis instead being placed upon clearly illustrating the principles of the present embodiments.

DETAILED DESCRIPTION

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean at least one.

Figure 1:
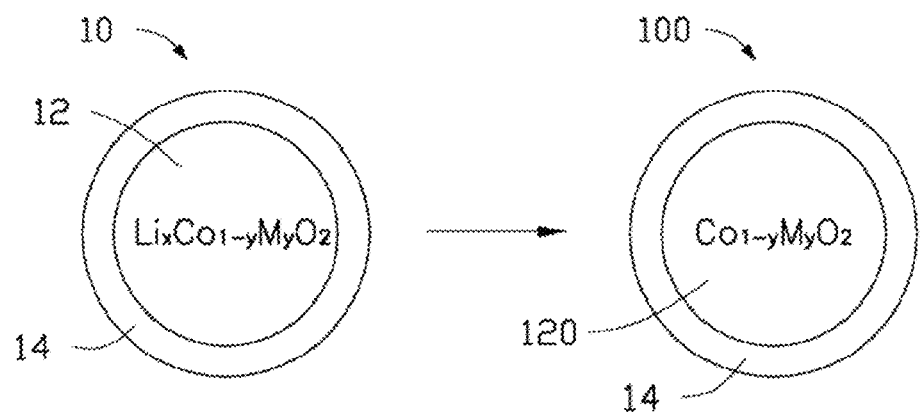
FIG. 1 is a schematic view of an embodiment of a method for making a composite of cobalt oxide.
Figure 2:
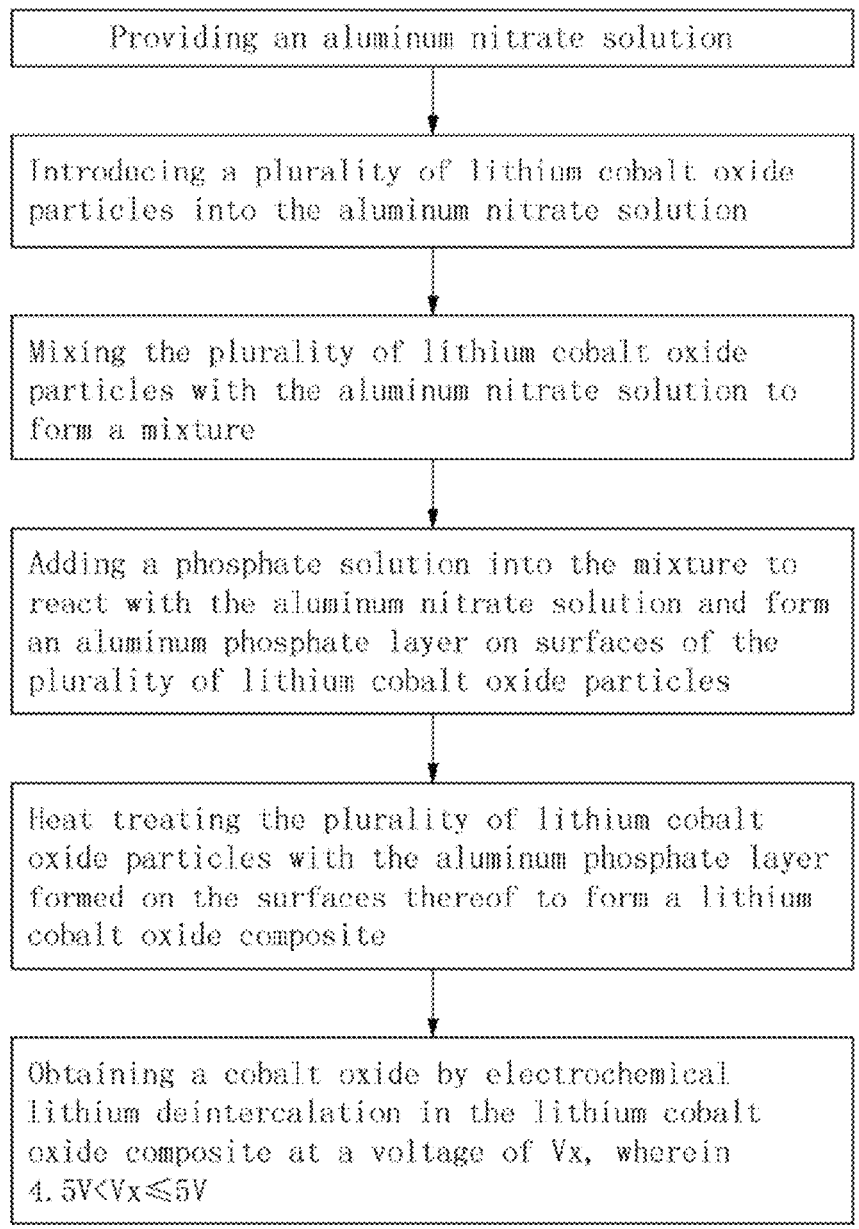
FIG. 2 is a flowchart of an embodiment of the method for making the composite of cobalt oxide.

Referring to FIG. 1 and FIG. 2, one embodiment of a method for making a cobalt oxide 120 including steps of:

S1, providing a lithium cobalt oxide composite 10; and

S2, obtaining cobalt oxide 120 by electrochemical lithium deintercalation in the lithium cobalt oxide composite at a voltage of Vx, wherein 4.5V<Vx≤5V, to deintercalate lithium ions from the lithium cobalt oxide composite 10.

The lithium cobalt oxide composite 10 has a core-shell structure, including lithium cobalt oxide particle 12 and an aluminum phosphate ($AlPO_4$) layer 14 coated on a surface of the lithium cobalt oxide particle 12.

A mass percentage of the $AlPO_4$ layer 14 to the lithium cobalt oxide composite 10 can be in a range from about 0.1% to about 3%. A thickness of the $AlPO_4$ layer 14 can be in a range from about 5 nanometers (nm) to about 20 nm. The $AlPO_4$ layer 14 can be an in situ formed layer on the surface of the lithium cobalt oxide particle 12 and is a continuous material layer of $AlPO_4$ having a uniform thickness. Furthermore, the interfacial diffusion may occur at the interface between the $AlPO_4$ layer 14 and the lithium cobalt oxide particle 12, and cobalt atoms of the lithium cobalt oxide particle 12 may diffuse into the $AlPO_4$ layer 14, to form a Co—Al—O co-oxide.

The material of lithium cobalt oxide particle 12 has a layered type structure, and can be doped or undoped. The layered type lithium cobalt oxide can be represented by a chemical formula of $Li_xCo_{1-y}M_yO_2$, wherein 0.1≤x≤1.1, 0≤y≤0.9. In one embodiment, 0.1<y<0.5. M represents at least one of the chemical elements of alkali metal elements, alkaline-earth metal elements, Group-13 elements, Group-14 elements, transition metal elements, and rare-earth elements. In one embodiment, M represents at least one of the chemical elements of manganese (Mn), nickel (Ni), chromium (Cr), cobalt (Co), vanadium (V), titanium (Ti), aluminum (Al), iron (Fe), gallium (Ga), neodymium (Nd), and magnesium (Mg). In one embodiment, the material of lithium cobalt oxide particle 12 is $Li_xCoO_2$.

It is noted that, in step S1, the provided lithium cobalt oxide composite 10 can include a plurality of lithium cobalt oxide particles 12 individually and entirely coated by the $AlPO_4$ layer 14. One particle of the lithium cobalt oxide composite 10 includes a single lithium cobalt oxide particle 12 and an $AlPO_4$ layer 14 coated on a surface of the single lithium cobalt oxide particle 12.

A diameter of the lithium cobalt oxide particle 12 can be in a range from about 100 nm to about 100 microns. In one embodiment, the diameter of the lithium cobalt oxide particle 12 can be in a range from about 1 micron to about 20 microns.

Lithium ions can be deintercalated from the lithium cobalt oxide particle 12 while the core-shell structure is maintained. Therefore, a composite of cobalt oxide 100 can be formed. The composite of cobalt oxide 100 has a similar core-shell structure as the lithium cobalt oxide composite 10. The composite of cobalt oxide 100 includes the cobalt oxide 120 and an $AlPO_4$ layer 14 coated on a surface of the cobalt oxide 120. The $AlPO_4$ layer 14 is individually coated on the entire surface of the particle of the cobalt oxide 120.

The cobalt oxide 120 has a layered structure. The material of the cobalt oxide 120 can be represented by a chemical formula of $Co_{1-y}M_yO_2$, wherein 0≤y≤0.9. In one embodiment, 0.1<y<0.5. M represents at least one of the chemical elements of alkali metal elements, alkaline-earth metal elements, Group-13 elements, Group-14 elements, transition metal elements, and rare-earth elements. In one embodiment, M represents at least one of the chemical elements of manganese (Mn), nickel (Ni), chromium (Cr), cobalt (Co), vanadium (V), titanium (Ti), aluminum (Al), iron (Fe), gallium (Ga), neodymium (Nd), and magnesium (Mg). More specifically, the cobalt oxide 120 can be cobalt (IV) oxide, wherein the valence of the cobalt is +4. The cobalt oxide 120 is a product of deeply lithium-deintercalated lithium cobalt oxide. In one embodiment, the material of cobalt oxide 120 is cobalt dioxide ($CoO_2$).

One embodiment of a method for preparing the lithium cobalt oxide composite 10 includes steps of:

S11, providing an aluminum nitrate ($Al(NO_3)_3$) solution;

S12, introducing a plurality of lithium cobalt oxide particles 12 into the $Al(NO_3)_3$ solution, and mixing the plurality of lithium cobalt oxide particles 12 with the $Al(NO_3)_3$ solution to form a mixture;

S13, adding a phosphate solution into the mixture to react with the $Al(NO_3)_3$ solution and form an aluminum phosphate layer on surfaces of the lithium cobalt oxide particles 12; and S14, heat treating the lithium cobalt oxide particles 12 with the aluminum phosphate layer formed on the surfaces thereof.

The $Al(NO_3)_3$ solution includes liquid phase solvent and $Al(NO_3)_3$ dissolved in the solvent. The solvent can dissolve the $Al(NO_3)_3$, dissociating the $Al(NO_3)_3$ into $Al^{3+}$ and $NO_3^-$. Therefore, the solvent is not limited to water and can be a volatile organic solvent. In one embodiment, the solvent can be at least one of ethanol, acetone, chloroform, diethyl ether, dichloromethane, and ethylidene chloride. A reaction may occur between the lithium cobalt oxide particles 12 and the water thereby deteriorating the performance of the lithium cobalt oxide particles 12. The organic solvent may avoid this unwanted reaction.

In the step S12, the lithium cobalt oxide particles 12 cannot be dissolved in the $Al(NO_3)_3$ solution. A mixing of the lithium cobalt oxide particles 12 and the $Al(NO_3)_3$ solution forms a mixture containing both liquid phase and solid phase. In the mixture, a layer of $Al^{3+}$ is uniformly coated on the surface of the lithium cobalt oxide particle 12. The $Al^3$ ions can be uniformly adhered to the surface of the lithium cobalt oxide particle 12 to form a coating layer at the atomic level. Further, the amount of the lithium cobalt oxide particles 12 introduced to the $Al(NO_3)_3$ solution can be controlled according to the amount of the $Al^{3+}$ ions in the $Al(NO_3)_3$ solution, such that the amount of the $Al^{3+}$ ions is just sufficient to coat all the surfaces of the lithium cobalt oxide particles 12. The mixture can be pasty. The pasty mixture is formed when the amount of the $Al(NO_3)_3$ solution is just enough to coat the entire surfaces of the lithium cobalt oxide particles 12. The pasty mixture can be formed by controlling a volumetric ratio of the $Al(NO_3)_3$ solution and the lithium cobalt oxide particles 12. In one embodiment, the volumetric ratio of the $Al(NO_3)_3$ solution and the lithium cobalt oxide particles 12 can be in a range from about 1:10 to about 1:40. A diameter of the lithium cobalt oxide particles 12 can be smaller than 20 microns. The amount of the $Al(NO_3)_3$ in the mixture can be determined from the amount of the aluminum phosphate layer to be formed on the surface of the lithium cobalt oxide particles 12. In one embodiment, a mass percentage of the aluminum phosphate layer in the lithium cobalt oxide composite 10 can be in a range from about 0.1% to about 3%.

In the step S13, the phosphate solution includes a liquid phase solvent (e.g., water), and a phosphate that can dissolve in the solvent. The phosphate can be monoammonium phosphate ($NH_4H_2PO_4$), diammonium phosphate (($NH_4$)$_2HPO_4$), ammonium phosphate (($NH_4$)$_3PO_4$), phosphoric acid ($H_3PO_4$), or combinations thereof. The phosphate solution can include phosphate radical ions such as phosphate ion ($PO_4^{3-}$), dihydrogen phosphate ion ($H_2PO_4^-$), hydrogen phosphate ion ($HPO_4^{2-}$), and combinations thereof, dissociated from the phosphate. The phosphate solution is added to the pasty mixture and the phosphate radical ions react with the $Al^{3+}$ located about the surface of the lithium cobalt oxide particle 12. Thus, a uniform aluminum phosphate layer can be formed on the surface of the lithium cobalt oxide particle 12 in situ. In one embodiment, the phosphate solution can be added to the pasty mixture drop by drop, while stirring the mixture, to react the phosphate radical ions entirely and evenly with the $Al^{3+}$ on the surface of the lithium cobalt oxide particle 12. Similar to the $AlPO_4$ solution, the amount of the phosphate solution can be determined from the amount of the aluminum phosphate layer to be formed on the surface of the lithium cobalt oxide particle 12.

In the step S14, the heat treating step can firmly combine the aluminum phosphate layer and the lithium cobalt oxide particle 12 at the interfaces therebetween, to form the lithium cobalt oxide composite material. Meanwhile, the residual solvent and other reacting products (e.g. ammonium nitrate ($NH_4NO_3$)) can be removed from the final product. In addition, interface diffusion between the aluminum phosphate layer and the lithium cobalt oxide particle 12 may be occurred during the heat treating. The cobalt atoms of the lithium cobalt oxide particle 12 may be diffused into the aluminum phosphate layer. The heat treating temperature can be in a range from about 400° C. to about 800° C. A heat treating time period can be in a range from about 0.5 hours to about 2 hours.

In the method, the lithium cobalt oxide particles 12 are previously introduced to the $Al(NO_3)_3$ solution, and then the phosphate is added to react with the $Al^{3+}$ on the surfaces of the lithium cobalt oxide particles 12, to in situ form the $AlPO_4$ layer coated on the lithium cobalt oxide particles 12. The liquid phase of $Al(NO_3)_3$ solution is mixed with the solid phase of lithium cobalt oxide particles 12. Therefore, the $Al^{3+}$ can be uniformly coated on the surfaces of the lithium cobalt oxide particles 12. Accordingly, the in situ formed aluminum phosphate layer can also be uniformly coated on the surfaces of the lithium cobalt oxide particles 12. Instead of forming the $AlPO_4$ particles and then absorbing the $AlPO_4$ particles by the surfaces of the lithium cobalt oxide particles 12, the uneven absorption between the solid phase of $AlPO_4$ and the solid phase of lithium cobalt oxide particles 12 is avoided. Therefore, an uneven coating of the lithium cobalt oxide particles 12 is avoided. The $AlPO_4$ layer 14 can coat a single lithium cobalt oxide particle 12, and each of the lithium cobalt oxide particles 12 that is subsequently introduced can have the $AlPO_4$ layer 14 coated on the surface thereof. The method is suitable for industrialization. In addition, the in situ formed $AlPO_4$ layer 14 is an integrated and continuous material layer having uniform thickness, not just a plurality of $AlPO_4$ particles joined together. In use of lithium ion battery, the $AlPO_4$ layer 14 can prevent an electron migration between the electrolyte and the lithium cobalt oxide particles 12 and allow the lithium ions to pass therethrough. Thus, the side reaction during the charge and discharge of the lithium ion battery between the electrolyte and the lithium cobalt oxide particles 12 can be suppressed even at a relatively high voltage. Therefore, the electrode composite material has improved chemical and thermal stabilities, even at a relatively high or low charge/discharge voltage, or a high rate.

The step S2 can further include steps of:

S21, assembling an electrochemical cell adopting the lithium cobalt oxide composite 10 as a cathode active material; and S22, charging the electrochemical cell to deintercalating lithium ions from the lithium cobalt oxide particle 12, thereby achieving the cobalt oxide 120.

The electrochemical cell can be a lithium ion battery or other electrochemical battery. One embodiment of the lithium ion battery includes a cathode, an anode, and a non-aqueous electrolyte disposed between the cathode and the anode. The cathode electrode includes a cathode current collector and a cathode material layer disposed on a surface of the cathode current collector. The anode electrode includes an anode current collector and an anode material layer disposed on a surface of the anode current collector.

The cathode material layer can include the lithium cobalt oxide composite, a conductive agent, and a binder mixed with each other. A ratio between the lithium cobalt oxide composite, the conductive agent, and the binder can be a common ratio used in a lithium ion battery. In one embodiment, the mass percentage of the lithium cobalt oxide in the total mass of the cathode material layer can be in a range from about 70% to about 98%. The anode material layer can include an anode active material, a conductive agent, and a binder. The anode active material can be lithium metal, lithium titanate, graphite, acetylene black, organic cracking carbon, mesocarbon microbeads (MCMB), or any combination thereof. The conductive agent can be at least one of acetylene black, carbon fibers, carbon nanotubes, and graphite. The binder can be at least one of polyvinylidene fluoride (PVDF), polytetrafluoroethylene (PTFE), and styrene-butadiene rubber (SBR). The non-aqueous electrolyte can be a solid film or a solution including a lithium salt dissolved in an organic solvent. The lithium salt may be at least one of $LiPF_6$, LiBOB, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, LiCl, and LiI. The organic solvent can be a cyclic carbonate and linear carbonate, and can be at least one of ethylene carbonate (EC), propylene carbonate (PC), ethylmethyl carbonate (EMC), diethyl carbonate (DEC), and dimethyl carbonate (DMC). The lithium ion battery can further include a porous membrane or a separator located between the cathode electrode and the anode electrode. The material of the separator can be polypropylene (PP) or polyethylene (PE). The lithium ion battery can further include an exterior encapsulating structure such as a hard battery case or a soft encapsulating bag. The lithium ion battery can further include a connecting component achieving an electrical connection between the current collector of the lithium ion battery and the external circuit.

Figure 3:
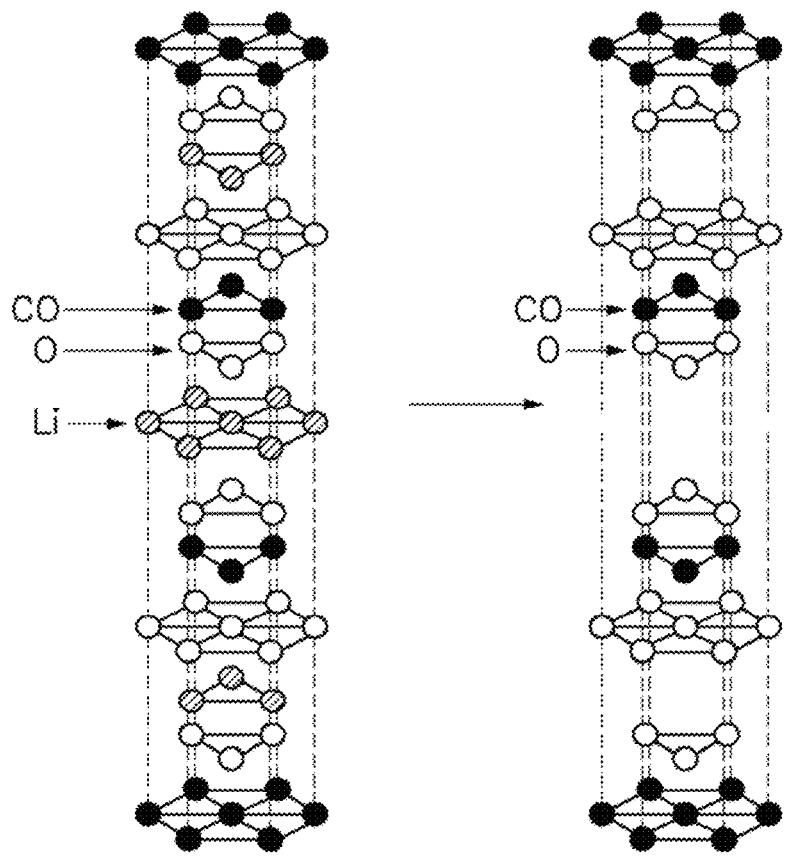
FIG. 3 is a schematic view of a structure of a layered type lithium cobalt oxide and an embodiment of cobalt oxide.

In the step S22, the lithium cobalt oxide has an electrochemical reaction to deintercalate the lithium ions from the $Li_xCo_{1-y}M_yO_2$, and thus forming the $Co_{1-y}M_yO_2$. More specifically, the lithium ion battery can be galvanostatic charged, constant-voltage charged, or the combination thereof. In one embodiment, all the lithium ions can be deintercalated from the lithium cobalt oxide. Vs can be in a range of $4.5V<Vs\leq 5V$, wherein Vs is a cut-off voltage of the galvanostatic charge or the voltage of the constant-voltage charge. The lithium ion battery can be galvanostatic charged to 5V, or constant-voltage charged at 5V for a period of time. The time of the constant-voltage charge is related to the amount of the lithium cobalt oxide. In one embodiment, the time is about 20 minutes to about 20 hours. During the charging process, the lithium ions are deintercalated from the lithium cobalt oxide particle, go through the $AlPO_4$ layer 14, and intercalate into the anode electrode. Referring to FIG. 3, for the $LiCoO_2$ as an example, when the lithium ions are deintercalated from the $LiCoO_2$, $CoO_2$ having layered structure is left. The $AlPO_4$ protects the $CoO_2$ from being reduced to a lower valence state of the cobalt. The interfacial diffusion can occur at the interface between the $AlPO_4$ layer 14 and the lithium cobalt oxide particle 12, and cobalt atoms of the lithium cobalt oxide particle 12 may diffuse into the $AlPO_4$ layer 14, to form a Co—Al—O co-oxide. The Co—Al—O co-oxide can prevent or suppress the reduction of the cobalt in +4 of the $CoO_2$, to make the $CoO_2$ be existed stably.

It is to be understood that, the electrochemical lithium-deintercalating step of S2 may not be processed in the electrochemical cell, and can be processed at other devices as long as substantially all the lithium ions are deintercalated. For example, the lithium cobalt oxide composite 10 can be arranged in an electrolytic cell as a positive electrode to have the lithium-deintercalation.

A uniform thickness and continues of $AlPO_4$ layer is coated on the surface of the lithium cobalt oxide particle 12 to improve the electrochemical stability of the lithium cobalt oxide at a relatively high voltage to deeply deintercalate the lithium ions from the lithium cobalt oxide, thereby achieving the cobalt (IV) oxide. The cobalt (IV) oxide has a layered structure and can be used at least in a primary lithium battery.

EXAMPLES

Example 1

In Example 1, the lithium cobalt oxide composite is an $AlPO_4$—$LiCoO_2$ composite material including $LiCoO_2$ particles and an $AlPO_4$ layer 14 coated on a surface of each of the $LiCoO_2$ particles. The mass percentage of the $AlPO_4$ layer in the cathode composite material is about 1%.

Figure 4:
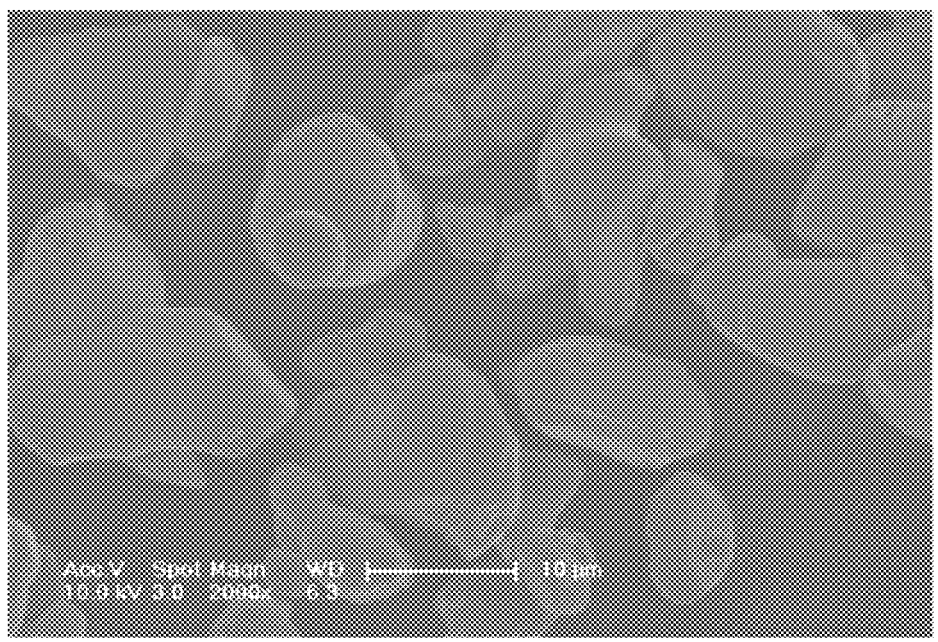
FIG. 4 shows a Scanning Electron Microscope (SEM) image of an embodiment of a lithium cobalt oxide composite.
Figure 5:
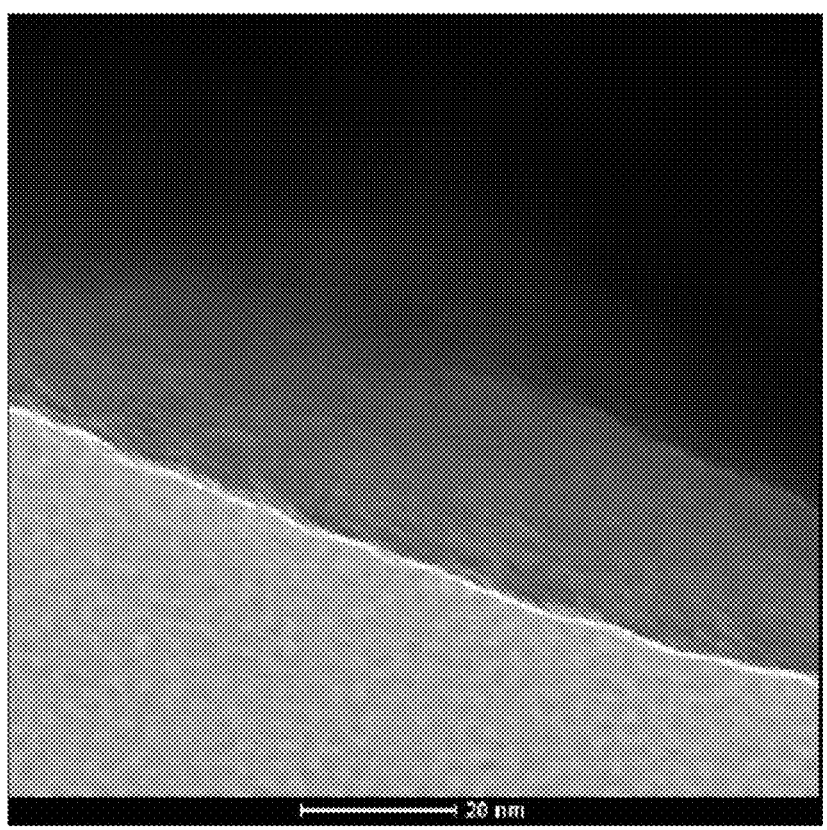
FIG. 5 shows a Transmission Electron Microscope (TEM) image of the embodiment of the lithium cobalt oxide composite.

In the method of preparing the lithium cobalt oxide composite, $Al(NO_3)_3$ is dissolved in ethanol to form the $Al(NO_3)_3$ solution. 100 g of $LiCoO_2$ particles is introduced to the 30 mL and 0.16 mol/L of $Al(NO_3)_3$ solution, and stirred to form a pasty mixture. Water solution of $(NH_4)_2HPO_4$ is added to the pasty mixture drop by drop. Then, the mixture is uniformly stirred until the $AlPO_4$ is totally precipitated on the surfaces of the $LiCoO_2$ particles. The $LiCoO_2$ particles coated by the $AlPO_4$ layer are heated at about 400° C. Referring to FIG. 4 of the SEM photo, in the product, the $AlPO_4$ layer is uniformly coated on the surface of the $LiCoO_2$ particle. Referring to FIG. 5 of the TEM photo, the $AlPO_4$ layer formed is a material layer having uniform thickness coated on the surface of the $LiCoO_2$ particle.

Example 2

In Example 2, the lithium cobalt oxide composite is an $AlPO_4$—$LiCoO_2$ composite material prepared in the same method as in Example 1, except for heating the $LiCoO_2$ particles coated by the $AlPO_4$ layer at about 500° C.

Example 3

In Example 3, the lithium cobalt oxide composite is an $AlPO_4$—$LiCoO_2$ composite material prepared in the same method as in Example 1, except for heating the $LiCoO_2$ particles coated by the $AlPO_4$ layer at about 600° C.

Example 4

In Example 4, the lithium cobalt oxide composite is an $AlPO_4$—$LiCoO_2$ composite material prepared in the same method as in Example 1, except that the mass percentage of the AlPO$_4$ layer in the cathode composite material is about 1.5% and the LiCoO$_2$ particles coated by the AlPO$_4$ layer are heated at about 600° C.

Electrochemical Experiment 1

A half cell is assembled by using the lithium cobalt oxide composite formed in Example 1. The lithium cobalt oxide composite formed in Example 1, acetylene carbon black as a conductive agent, and polyvinylidene fluoride (PVDF) as a binder are mixed in N-methyl pyrrolidone (NMP) in a mass ratio of about 90:5:5, to form a slurry. The slurry is applied to the surface of an aluminum foil and dried at about 100° C. to remove NMP, and achieve the cathode electrode. The anode electrode is lithium metal. 1 mol/L LiPF$_6$/EC+DEC (1:1) is used as an electrolyte solution. The separator is a porous polypropylene film. The assembled half cell is cycled at a current of about 0.5 C (C-rate) between a discharge cut-off voltage of 2.7V and a charge cut-off voltage of 4.5V at room temperature.

Electrochemical Experiments 2-4

Three half cells are assembled and cycled according to the same conditions as in the Electrochemical Experiment 1, except that the cathode composite material formed in Example 1 is respectively replaced by the cathode composite materials in Examples 2-4.

Figure 6:
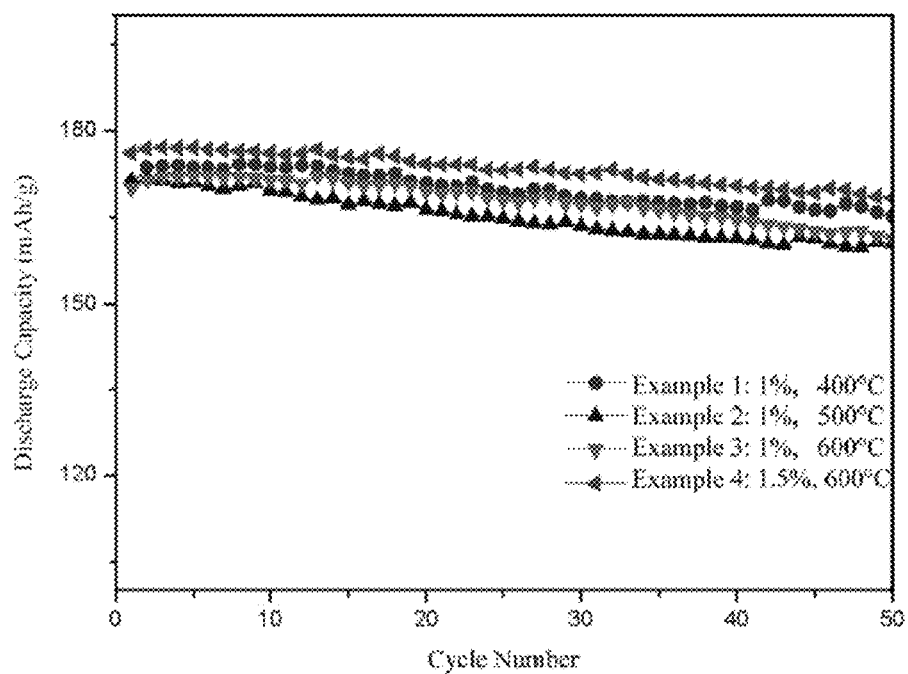
FIG. 6 is a graph of cycle performance testing results of half cells using the cathode electrode including the embodiment of the lithium cobalt oxide composite.

Referring to FIG. 6, the half cells of Examples 1-4 all use uniformly coated LiCoO$_2$ particles with AlPO$_4$ layer as the cathode active material, and have relatively high capacity in and capacity retention (i.e., capacity maintenance rate). After 50 cycles, the capacity retentions of the half cells are all above 90%, and the capacities are in a range from about 160 mAh/g to about 175 mAh/g. The half cell having the higher heat treating temperature has a higher capacity. However, the change in mass percentage of the AlPO$_4$ layer in the cathode composite material from 1% to 1.5% does not have much effect to the capacity of the half cell. The AlPO$_4$ layer modifies the surface structure of the LiCoO$_2$, provides a lithium intercalation/deintercalation platform, and works as a barrier layer to suppress the chemical reaction between Co$_{4+}$ and the electrolyte. Thus, the AlPO$_4$ layer improves the stability of the LiCoO$_2$, and the cycling performance of the lithium ion battery is improved.

Figure 7:
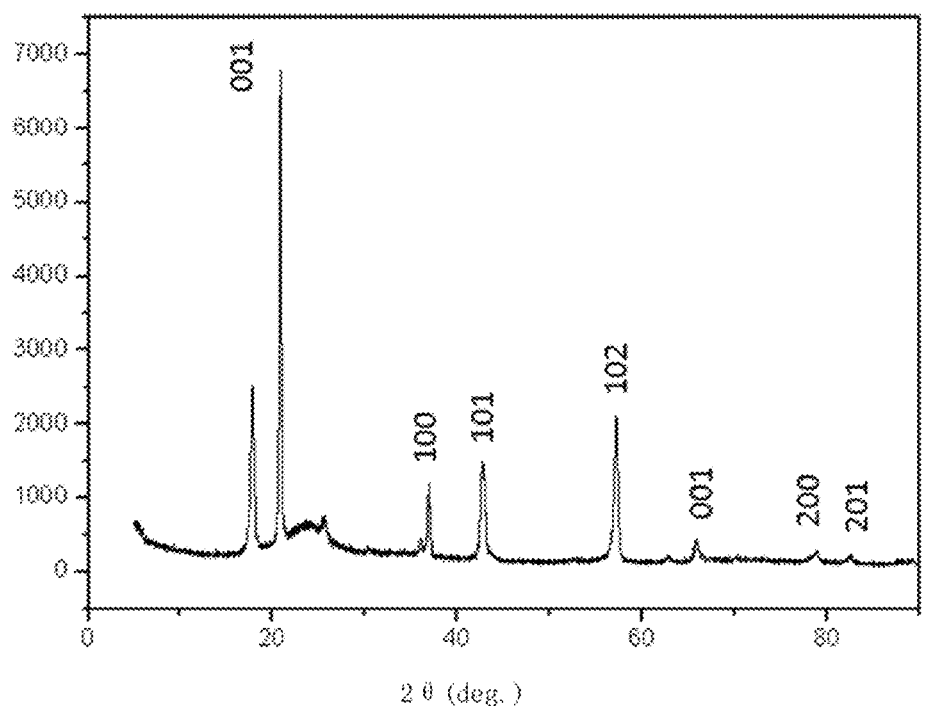
FIG. 7 is an X-ray diffraction (XRD) pattern of an embodiment of cobalt oxide.

Referring to FIG. 7, the half cells are charged to 5V, and then the half cells are disassembled, and the cathode electrode is separated from the half cell to be examined by XRD analysis. As shown in the XRD pattern, the diffraction peaks of CoO$_2$ are labeled to prove that the layered type CoO$_2$ is achieved. Further, in FIG. 7, the first unlabeled peak from the left side of the pattern may be the peak of the residual Li$_x$CoO$_2$, and the relatively wide unlabeled peak at 20 degree to 30 degree may be the amorphous AlPO$_4$. The CoO$_2$ has a layered structure after the lithium ions are deintercalated therefrom, thus, the CoO$_2$ can be used as a cathode active material in a lithium ion battery to have the lithium ions intercalated therein.

Comparative Example

In Comparative Example 1, a comparative lithium cobalt oxide composite is prepared. A water solution of (NH$_4$)$_2$HPO$_4$ and a water solution of Al(NO$_3$)$_3$ are mixed together and stirred to form a mixture including a plurality of AlPO$_4$ particles dispersed in water. LiCoO$_2$ particles are added to the mixture, and the AlPO$_4$ particles are absorbed to the surfaces of the LiCoO$_2$ particles. The LiCoO$_2$ particles having the AlPO$_4$ particles absorbed thereon are filtered and heated at about 600° C., to form the comparative lithium cobalt oxide composite.

Figure 8:
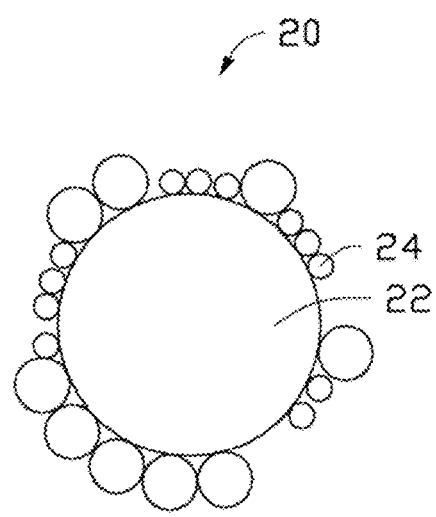
FIG. 8 is a schematic view of a comparative example of a lithium cobalt oxide composite.
Figure 9:
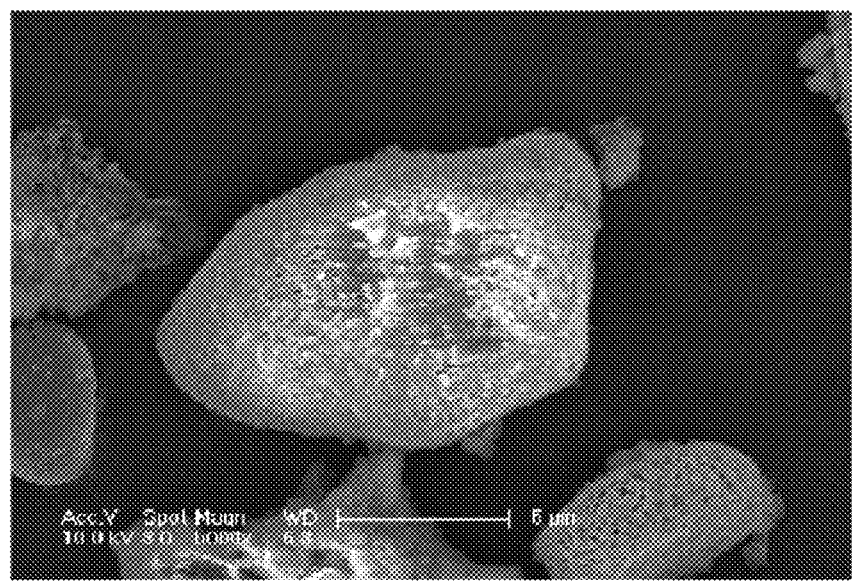
FIG. 9 shows a SEM image on low magnification of the example of the comparative lithium cobalt oxide composite.
Figure 10:
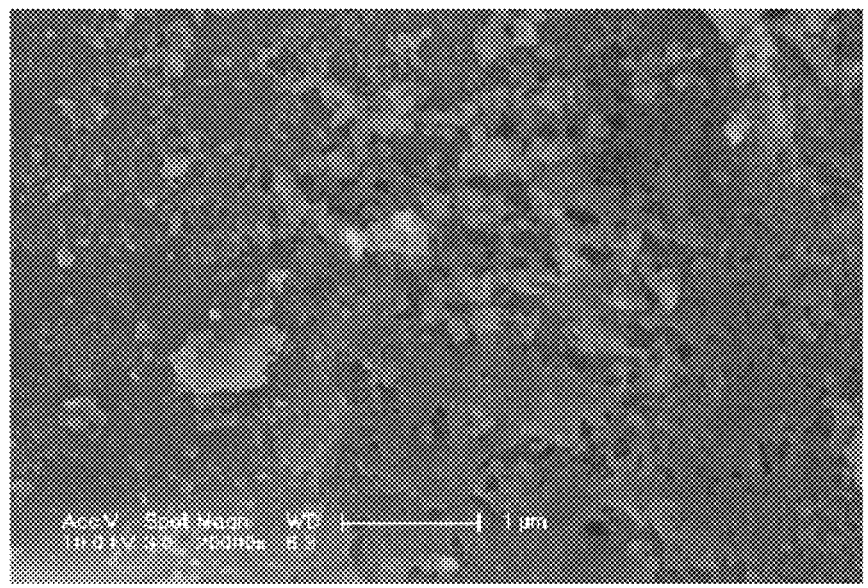
FIG. 10 shows a SEM image on high magnification of the example of the comparative lithium cobalt oxide composite.

In the method, the pre-prepared AlPO$_4$ particles are added in water, and then the LiCoO$_2$ particles are mixed with the AlPO$_4$ in the water. The AlPO$_4$ particles adhere to the surface of the LiCoO$_2$ particles. The water is then evaporated and the LiCoO$_2$ particles with the AlPO$_4$ particles absorbed thereon are heated to form the comparative lithium cobalt oxide composite. However, AlPO$_4$ is insoluble in water. Therefore, in the above method, AlPO$_4$ particles may not disperse sufficiently in the water and could aggregate together. Further, when a large amount of the LiCoO$_2$ particles is added in the water, the LiCoO$_2$ particles added earlier in time will absorb the majority of the AlPO$_4$ particles in the water, and the subsequently added LiCoO$_2$ particles may not have enough AlPO$_4$ particles to absorb. The uneven absorption occurs most often when adding a relatively large amount of LiCoO$_2$ particles, which is a problem for industrialization of this composite material. Furthermore, referring to FIG. 8, even though it may appear that the LiCoO$_2$ is coated well, a microscopic view of the AlPO$_4$ may show that the small particles 22 coated on the surface of the LiCoO$_2$ large particle 24 do not form a uniform AlPO$_4$ substance layer. Accordingly, the LiCoO$_2$ cannot be stable at relatively high charging voltage, and the lithium ions cannot be thoroughly deintercalated therefrom. Referring to FIG. 9 and FIG. 10, it can be seen from the SEM photo that, the AlPO$_4$ is in a particle shape aggregated on the surface of the LiCoO$_2$ particle. The AlPO$_4$ particles are aggregated together, and the coating is not uniform.

Comparative Experiment 1

A Half cell is assembled and cycled according to the same conditions as in Electrochemical Experiment 1, except that the lithium cobalt oxide composite formed in Example 1 is replaced by uncoated LiCoO$_2$ particles.

Comparative Experiment 2

A half cell is assembled and cycled according to the same conditions as in Electrochemical Experiment 1, except that the lithium cobalt oxide composite formed in Example 1 is replaced by the comparative lithium cobalt oxide composite in Comparative Example.

Figure 11:
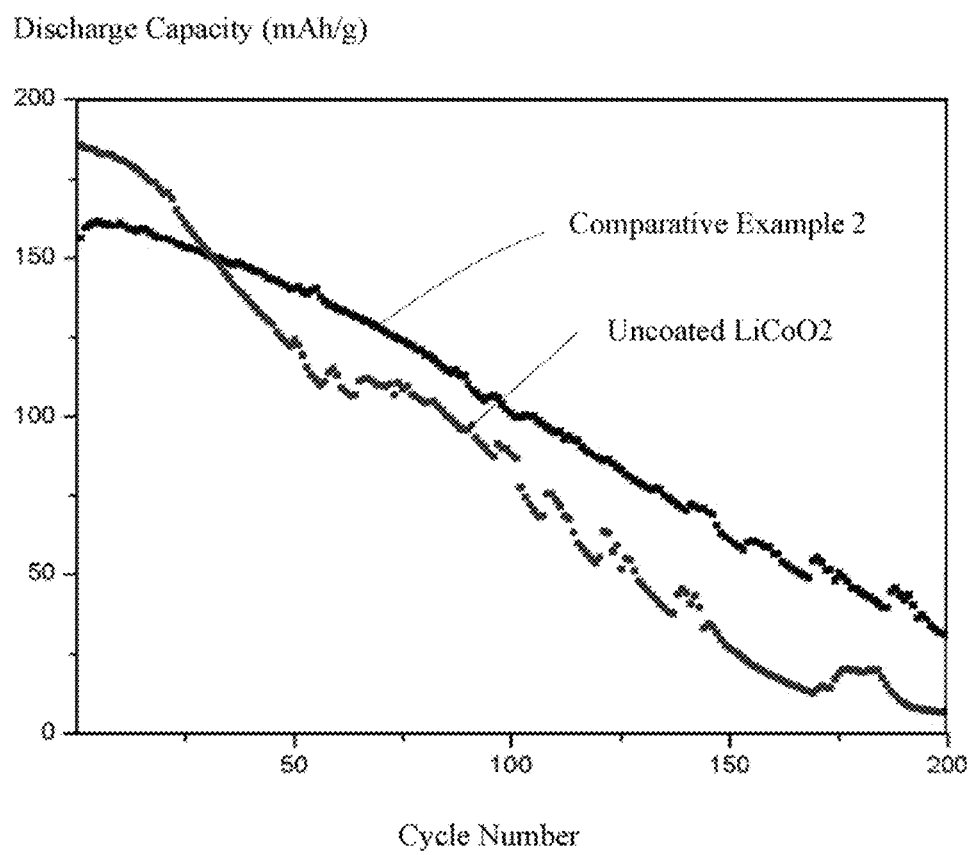
FIG. 11 is a graph showing cycle performance testing results of half cells using the example of the comparative composite of $LiCoO_2$.

Referring to FIG. 11, even charged to a relatively low voltage of 4.5V, the half cells of the comparative lithium cobalt oxide composite in Comparative Example 1 and the uncoated LiCoO$_2$ particles both have a rapid drop of capacity. After 50 cycles, the capacity retentions of the two half cells are both smaller than 85%. This is mainly because the uneven coating or uncoated LiCoO$_2$ is relatively unstable at relative high charge cut-off voltage. At the high charge cut-off voltage, the LiCoO$_2$ may have a side reaction with the electrolyte, to decrease the capacity. Thus, the CoO$_2$ cannot be achieved by charging the half cells.

Depending on the embodiment, certain steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

Finally, it is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

What is claimed is:

1. A composite of cobalt oxide comprising a cobalt oxide and an aluminum phosphate layer coated on a surface of the cobalt oxide, wherein the cobalt oxide is represented by a chemical formula of $Co_{1-y}M_yO_2$, wherein $0<y\leq0.9$, and M is other than Co and selected from the group consisting of alkali metal elements, alkaline-earth metal elements, Group-13 elements, Group-14 elements, transition metal elements, and rare-earth elements, a thickness of the aluminum phosphate layer is in the range from about 5 nanometers to about 20 nanometers.

2. The composite of cobalt oxide of claim 1, wherein a mass percentage of the aluminum phosphate layer is in a range from about 0.1% to about 3%.

3. The composite of cobalt oxide of claim 1, wherein M is selected from the group consisting of Mn, Ni, Cr, V, Ti, Al, Fe, Ga, Nd and Mg.

4. The composite of cobalt oxide of claim 1 further comprises a Co—Al—O co-oxide.

5. A composite of cobalt oxide consisting of a cobalt oxide, an aluminum phosphate layer coated on a surface of the cobalt oxide, and a Co—Al—O co-oxide, wherein the cobalt oxide is represented by a chemical formula of $Co_{1-y}M_yO_2$, wherein $0<y\leq0.9$, and M is other than Co and selected from the group consisting of alkali metal elements, alkaline-earth metal elements, Group-13 elements, Group-14 elements, transition metal elements, and rare-earth elements.

6. The composite of cobalt oxide of claim 5, wherein a mass percentage of the aluminum phosphate layer is in a range from about 0.1% to about 3%.

7. The composite of cobalt oxide of claim 5, wherein a thickness of the aluminum phosphate layer is in a range from about 5 nanometers to about 20 nanometers.

8. The composite of cobalt oxide of claim 5, wherein M is selected from the group consisting of Mn, Ni, Cr, V, Ti, Al, Fe, Ga, Nd, and Mg.

* * * * *